Patented Dec. 12, 1939

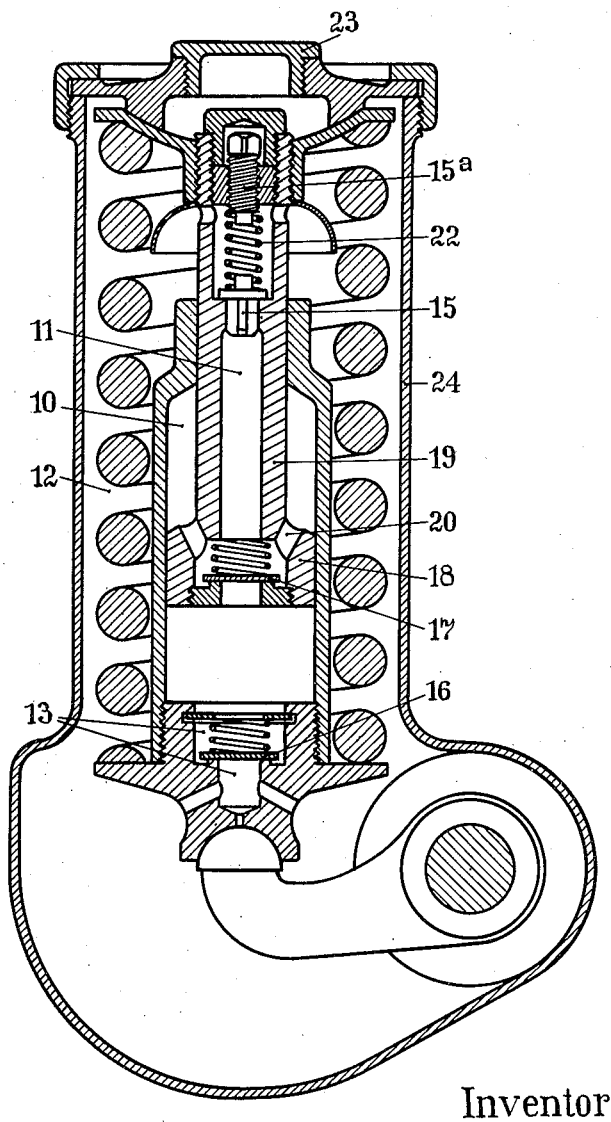

2,183,129

UNITED STATES PATENT OFFICE 2,183,129

HYDRAULIC SHOCK ABSORBER FOR VEHICLES

Richard Binder and Hermann Klein, Schweinfurt, Germany

Application May 11, 1937, Serial No. 141,900
In Germany May 16, 1936

3 Claims. (Cl. 267—34)

This invention relates to hydraulic shock absorbers for vehicles, and more particularly to the type, having a cylinder and a piston movable therein, the free end of the relatively displaceable parts being respectively attached to the axle and the frame of an automobile.

The object of the invention is to provide a double acting shock absorber of cylindrical form and of limited length, adapted to work as a directly acting pump between supporting parts and springy mounted parts and having all its elements enclosed in a common shell by which the pressure of the liquid working therein is received.

This object is attained by the arrangement of a housing enclosing a pump cylinder, and forming therewith a compact unit, and a piston and piston rod reciprocable in said cylinder. The piston rod is provided with an axial bore forming a conduit controlled by one or more valves, so that flow of working liquid through said bore to a compensating chamber is always in one direction for operations of said piston in either direction.

Other objects and effects of the invention will appear from the following detailed description of the construction of the device and new features will be disclosed in the appended claims.

In the following drawing, there is shown a longitudinal sectional view of a hydraulic shock absorber embodying the present invention.

The shock absorber is shown combined with the spring suspension of a single wheel, and comprises a pump cylinder 10, enclosed in a housing 24, forming with said cylinder a compensating chamber 12, filled with liquid such as oil. Reciprocable in the pump cylinder 10 is a piston 18, dividing said cylinder into two displacement chambers, and a hollow piston rod 19, passing through the upper end of said cylinder. Mounted in the piston 18 is a non-return valve 17, permitting communication between the two displacement chambers when said piston is moving relatively in a direction to enlarge the upper displacement chamber through which the piston rod 19 extends. Between the latter displacement chamber and the axial bore 11 are by-pass conduits 20. A foot valve 16 in the cylinder 10 is operable to afford communication through a valve chamber 13 between the compensating chamber 12 and the other lower displacement chamber below the piston 18, when the said piston is moved relatively to enlarge said lower displacement chamber.

A valve 15, mounted at the upper end of the piston rod 19 in the bore 11 thereof, and pressed on its seat by a spring 22, controls liquid flow between said bore and the compensating chamber 12. A screw 15a, threaded in a bushing at the upper end of the piston rod 19, and engaging the spring 22, serves to gradually change the throttling effect of the valve 15 by regulating the tension of said spring. Access to this screw 15a is obtained by unscrewing a cap 23 at the upper end of the housing, and a smaller cap over the head of said screw threaded into the upper end of the piston rod 19.

The suspension spring is mounted in the housing 24, and has its opposite ends abutting substantially the opposite ends of the pump cylinder 10 and the piston rod 19 respectively, for resisting relative axial movement between the piston 18 and said cylinder in one direction.

When the piston 18 is moved relatively in the upward direction, the liquid in the displacement chamber above said piston is forced through conduits 20 and the bore 11, and will open the valve 15 against the action of the spring 22, so that said liquid flows into the compensating chamber 12. At the same time, the valve 16 will open, so that the displacement chamber below the piston 18 is filled with the liquid entering from the compensating chamber 12.

When the piston 18 is moved relatively in a downward direction, the valve 17 will be opened by the action of the liquid in the lower displacement chamber, so that the liquid in said displacement chamber will flow through said valve into the upper displacement chamber. Due to the differential construction of the plunger resulting from the volume occupied by the piston rod 19 in the upper displacement chamber, the liquid flowing through the open valve 17 from the lower displacement chamber to the upper displacement chamber will be greater than that necessary to fill the expanding upper chamber, so that the excess flows upwardly in the bore 11, opens the valve 15, and flows out into the compensating chamber. It is seen that the bore 11 serves as a conduit through which the liquid flows always in one direction, irrespective of the direction of movement of the piston 18.

We claim:

1. A hydraulic shock absorber of the spring suspension type including a casing, a pump cylinder in said casing, forming with said casing a compensating chamber and movable axially therein, a spring for said cylinder, a plunger piston in said cylinder forming two displacement chambers, said plunger having an actuating rod connected thereto and extending through one of said displacement chambers and through one end of said cylinder, said rod having a central bore extending axially thereof and forming a liquid conduit, a passage in said piston affording communication between the two displacement chambers, a non-return valve in said passage automatically operable into open position only during the movement of said piston away from said cylinder end, said bore having an inlet near said piston communicating with the chamber through which said rod passes and a single outlet communicating with said compensating chamber, a spring pressed valve controlling the flow through said outlet and between said bore and said compensating chamber and a non-return valve at one end of the other displacement chamber controlling the liquid flow from said compensating chamber into said other displacement chamber.

2. A device of the class described including a housing, a hydraulic shock absorber in said housing including a pump having a cylinder, a piston therein reciprocal with respect to said cylinder and dividing said cylinder into two displacement chambers, a hollow piston rod connected to said piston and extending through one end of said cylinder, a compensating chamber formed in said housing, a non-return valve on said piston permitting communication between the two displacement chambers when said piston is moving relatively in a direction to enlarge the displacement chamber through which said piston rod extends, a by-pass conduit between said latter chamber and the bore of said piston rod, a foot valve in said cylinder operable to afford communication between said compensating chamber and the other displacement chamber when said piston is moved relatively in the other direction, and a spring pressed valve controlling the flow between said piston bore and said compensating chamber, and a suspension spring in said housing for resisting relative axial movement between said piston and said cylinder in one direction.

3. In a device of the class described a housing, a hydraulic shock absorber in said housing including a pump having a cylinder, a piston therein reciprocal with respect to said cylinder and dividing said cylinder into two displacement chambers, a hollow piston rod connected to said piston and extending through one end of said cylinder, a compensating chamber formed in said housing, a non-return valve on said piston permitting communication between the two displacement chambers when said piston is moving relatively in one direction to enlarge the displacement chamber through which the piston rod extends, a by-pass conduit between said latter chamber and the bore of said piston rod, a foot valve operable to afford communication between said compensating chamber and the other displacement chamber when said piston is moving relatively in the other direction, a spring pressed valve controlling liquid flow between said piston bore and said compensating chamber, means for adjusting said latter valve to vary the throttling effect thereof, and a suspension spring in said housing having the ends thereof abutting substantially the opposite ends of said pump cylinder and said piston rod respectively, for resisting relative axial movement between said piston and said cylinder in one direction.

RICHARD BINDER.
HERMANN KLEIN.